US008762706B2

(12) United States Patent
Van Mengsel (10) Patent No.: US 8,762,706 B2
(45) Date of Patent: Jun. 24, 2014

(54) COMPUTER SYSTEMS, METHODS AND PROGRAM PRODUCT FOR MULTI-LEVEL COMMUNICATIONS

(75) Inventor: Johan Jozef K. Van Mengsel, Kontich (BE)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 13/084,047

(22) Filed: Apr. 11, 2011

(65) Prior Publication Data

US 2012/0260085 A1 Oct. 11, 2012

(51) Int. Cl.
*G06F 15/173* (2006.01)
(52) U.S. Cl.
USPC ........... 713/150; 713/151; 713/152; 713/153; 726/15
(58) Field of Classification Search
USPC .......................................................... 713/150
See application file for complete search history.

(56) References Cited

U.S. PATENT DOCUMENTS

| | | | | | |
|---|---|---|---|---|---|
| 4,449,384 | A | * | 5/1984 | Jones | 68/12.21 |
| 4,713,817 | A | * | 12/1987 | Wei | 714/758 |
| 4,910,732 | A | * | 3/1990 | Schwarz | 370/447 |
| 5,216,752 | A | * | 6/1993 | Tam | 706/17 |
| 6,233,251 | B1 | * | 5/2001 | Kurobe et al. | 370/471 |
| 6,233,324 | B1 | * | 5/2001 | Sebestyen | 379/100.17 |
| 7,519,721 | B2 | | 4/2009 | Godwin et al. | |
| 7,779,152 | B2 | | 8/2010 | Narayanan | |
| 2004/0215955 | A1 | * | 10/2004 | Tamai et al. | 713/150 |
| 2006/0101262 | A1 | * | 5/2006 | Haney | 713/153 |
| 2007/0214359 | A1 | * | 9/2007 | Williamson | 713/163 |
| 2008/0056287 | A1 | * | 3/2008 | Kagan et al. | 370/401 |
| 2008/0310344 | A1 | * | 12/2008 | Krishnan et al. | 370/328 |
| 2009/0097416 | A1 | * | 4/2009 | Gruber et al. | 370/254 |
| 2010/0049967 | A1 | | 2/2010 | Vaarala et al. | |
| 2010/0097992 | A1 | * | 4/2010 | Velev et al. | 370/328 |
| 2010/0223457 | A1 | | 9/2010 | Durham et al. | |

OTHER PUBLICATIONS

Stefan Lindskog and Anna Brunstrom, A Comparison of End-to-End Security Solutions for SCTP, p. 2.
Kurt Dietrich; Microcomputing Lab, Inst. For Appl. Inf. Process & Commun., Graz, A Secure and Reliable Platform Configuration Change Reporting Mechanism for Trusted Computing Enhanced Secure Channels, Young Computer Scientists, 2008. ICYCS 2008. The 9th International Conference For, Nov. 18-21, 2008, pp. 2137-2142.

* cited by examiner

*Primary Examiner* — Kambiz Zand
*Assistant Examiner* — Yonas Bayou
(74) *Attorney, Agent, or Firm* — George R. McGuire; Blaine T. Bettinger; Bond Schoeneck & King, PLLC (57) ABSTRACT

Systems, methods and a computer program product for facilitating multi-level communications within a computer system provide for generating while using a first network component a network data packet including a code within a field other than a payload field. The code corresponds with a coded communication within a library of coded communications. The network data packet is transmitted from the first network component to a designated second network component connected to the first network component that reads the code and selects the coded communication from the library of coded communications that corresponds with the code. The selected coded communication is then transmitted from the designated second network component to an intended recipient. The systems, methods and computer program product are applicable within the context of generalized computer systems, as well as restricted access computer systems.

24 Claims, 4 Drawing Sheets

COMPUTER SYSTEMS, METHODS AND PROGRAM PRODUCT FOR MULTI-LEVEL COMMUNICATIONS

BACKGROUND

1. Field of the Invention

The invention relates generally to communication capabilities within computer systems. More particularly, the invention relates to multi-level communication capabilities within computer systems.

2. Description of the Related Art

Common within the information technology art are computer communications systems and computer communications networks that are intended to facilitate information dissemination, distribution and communication between parties connected to the computer communications systems and the computer communications networks. Common computer communications systems and computer communications networks may include, but are not limited to: (1) Internet communications systems and communications networks; and (2) intranet communications systems and communications networks.

Also common within the information technology art are restricted access computer systems (i.e., including restricted access computer sub-systems) that are often used in commercial, government and military applications when it is desirable to provide secure storage capabilities and/or secure processing capabilities for classified data and/or classified information. To that end, in order to assure such secure storage capabilities and/or secure processing capabilities, transfer of classified data and/or classified information from restricted access computer systems is often effected using encryption methodology and encryption apparatus to assure that such classified data and/or such classified information is not otherwise readily transmitted from a restricted access computer system.

While computer communications systems and computer communications networks that include restricted access computer systems are nonetheless essential within the context of a greater overall classified data and/or classified information storage and/or processing capability within a secure information technology network, computer systems and computer networks in general, and restricted access computer systems and restricted access computer networks more particularly, are nonetheless not entirely without problems. In that regard, restricted access computer systems and restricted access computer networks often do not provide for ready dissemination of non-classified (i.e., non-restricted) communications from the restricted access computer systems and the restricted access computer networks.

Thus, desirable within the information technology art are: (1) computer systems and computer networks and related methods for operation thereof in general; and (2) restricted access computer systems and restricted access computer networks and related methods for operation thereof more particularly, that provide for enhanced communication capabilities that may include, but are not necessarily limited to, ready communication of non-classified data and/or non-classified information from restricted access computer systems and restricted access computer networks.

BRIEF SUMMARY

Embodiments include: (1) a generalized computer system and a restricted access computer system; and (2) methods for operating the generalized computer system and the restricted access computer system. Embodiments also include a related computer program product. Within the foregoing computer systems, methods and related computer program product, generation and transmission of a communication uses a library of coded communications. At a first network component within a computer system in accordance with the embodiments a code from the library of coded communications is included within a field within a network data packet other than a payload field within the network data packet. The network data packet is then transmitted to a designated second network component connected to the first network component within the computer system. The designated second network component reads the code included within the field other than the payload field within the network data packet and selects a coded communication from the library of coded communications that corresponds with the code. The selected corresponding coded communication is then transmitted from the designated second network component to an intended recipient of the selected coded communication.

Within the context of a restricted access computer system, the embodiments provide: (1) that the code within the library of coded communications is included within an unencryptable field within the network data packet other than the payload field within the network data packet; (2) the library of coded communications comprises a library of non-classified coded communications; and (3) that after encryption of the network data packet the code within the unencryptable field within the network data packet other than the payload field within the network data packet is read by the designated second network component that selects a non-classified coded communication from the library of non-classified coded communications that corresponds with the code and transmits the selected non-classified coded communication to the intended recipient of the selected non-classified coded communication.

Since the embodiments provide computer systems, related methods for operation thereof and a related program product that provide for communication using multiple fields within a network data packet (i.e., a payload field and a field (or unencryptable field) other than the payload field), the embodiments provide enhanced communication capabilities within computer systems and computer networks that may include, but are not necessarily limited to, restricted access computer systems and restricted access computer networks.

A computer system in accordance with the embodiments includes a first network component programmed to include within a field other than a payload field within a network data packet a code that corresponds with a coded communication within a library of coded communications. This particular computer system also includes a second network component located connected to the first network component and programmed to read the code within the field other than the payload field within the network data packet and select the coded communication from the library of coded communications that corresponds with the code.

Another computer system in accordance with the embodiments includes a first network component located in a restricted access computer sub-system and programmed to include within an unencryptable field other than a payload field within an unencrypted network data packet a code that corresponds with a non-classified coded communication within a library of non-classified coded communications. This particular computer system also includes an encryption component located at least in part within the restricted access computer sub-system, connected to the first network component and programmed to encrypt the unencrypted network data packet to provide an encrypted network data packet having the code within the unencryptable field other than the payload field. This particular computer system also includes a second network component located at least in part within a non-restricted access computer sub-system connected to the restricted access computer sub-system and the encryption component, and programmed to read the code within the unencryptable field other than the payload field within the encrypted network data packet and select the non-classified coded communication from the library of non-classified coded communications that corresponds with the code.

A particular method for multi-level communication within a computer system includes generating within a first network component a network data packet that contains within a field other than a payload field a code corresponding with a coded communication within a library of coded communications. This particular method also includes transmitting the network data packet from the first network component to a designated second network component connected to the first network component. This particular method also includes reading within the second network component the code within the field other than the payload field and selecting within the designated second network component the coded communication from the library of coded communications that corresponds with the code. This particular method also includes transmitting the selected coded communication from the library of coded communications that corresponds with the code from the second network component to an intended recipient of the selected coded communication.

Another particular method for non-classified communication from a restricted access computer system includes generating within a first network component within a restricted access computer sub-system an unencrypted network data packet that contains a code within an unencryptable field other than a payload field that corresponds with a coded communication within a library of coded communications. This particular method also includes transmitting the unencrypted network data packet from the first network component to an encryption component at least in-part within the restricted access computer sub-system. This particular method also includes encrypting within the encryption component the unencrypted network data packet to provide an encrypted network data packet that contains the code within the unencryptable field other than the payload field. This particular method also includes transmitting the encrypted network data packet from the encryption component to a designated second network component at least in-part within a non-restricted access computer sub-system connected to the restricted access computer sub-system. This particular method also includes reading within the designated second network component the code and selecting within the second network component the non-classified coded communication from the library of non-classified coded communications that corresponds with the code. This particular method also includes transmitting the selected non-classified coded communication from the designated second network component to an intended recipient of the selected non-classified coded communication.

A particular computer program product in accordance with the embodiments includes a tangible medium encoded with computer readable instructions to: (1) generate, while using a first network component, a network data packet having within a field other than a payload field a code for a coded communication from a library of coded communications; and (2) select, while using the code within the field other than the payload field within the network data packet, and a designated second network component connected to the first network component, the coded communication from the library of coded communications that corresponds with the code.

Within the embodiments when two or more components, such as but not limited to network components, are described as being "connected", it is intended that a network pathway exists between the two or more components, but not necessarily that the two or more components are directly connected. Rather, the two or more components may be connected through a network pathway with an intervening additional component or components interposed between the two or more components that are described as "connected". Nonetheless the following Detailed Description of the Embodiments contemplates but does not necessarily illustrate a direct connection between components such as but not limited to network components, and in particular a first network component and a designated second network component in accordance with the embodiments.

Within the embodiments as summarized above and described more fully below, a "designated" second network component (as well as a first network component) is intended as any of several network components (e.g., such as but not limited to a server, a terminal, a router and a firewall), including a plurality of network components, that have accessible thereto and associated therewith a library of coded communications to facilitate multi-level communication within a computer system in accordance with the embodiments.

Within the embodiments as summarized above and described more fully below, each of: (1) "a first network component"; (2) "a second network component"; and (3) "an encryption component" is intended to respectively include: (1) at least one first network component that provides at least a message codification function; (2) at least one second network component that provides at least a message decodification and transmission function; and (3) at least one encryption component that provides at least a network data packet encryption function. Thus, as will be clear within the context of further description below, use of the terminology "a", "an" "the" or other singular referents is also intended (in particular within the context of the claims that follow) to include both the singular and the plural referents, unless specifically indicated otherwise directly or by context. The terms "comprising", "having", "including" and "containing" are intended as open-ended terminology (i.e., meaning "including but not limited to") unless noted otherwise.

BRIEF DESCRIPTION OF THE SEVERAL VIEWS OF THE DRAWINGS

The objects, features and advantages of the embodiments are understood within the context of the Detailed Description of the Embodiments, as set forth below. The Detailed Description of the Embodiments is understood within the context of the accompanying drawings, which form a material part of this disclosure, wherein.

DETAILED DESCRIPTION

The embodiments, which include: (1) a generalized computer system and a restricted access computer system; (2) corresponding methods for operating the generalized computer system and the restricted access computer system; and (3) a related computer program product, all of which are related to multi-level communication within the generalized computer system and the restricted access computer system, are understood within the context of the description set forth below. The description set forth below is understood within the context of the drawings described above.

The following description will first describe a generalized computer system in accordance with the embodiments for multi-level communication, and a related method for operating the generalized computer system in accordance with the embodiments for multi-level communication. The following description will next describe a more specific restricted access computer system in accordance with the embodiments for multi-level communication, and a related method for operating the more specific restricted access computer system in accordance with the embodiments for multi-level communication.

Generalized Embodiment

Figure 1:
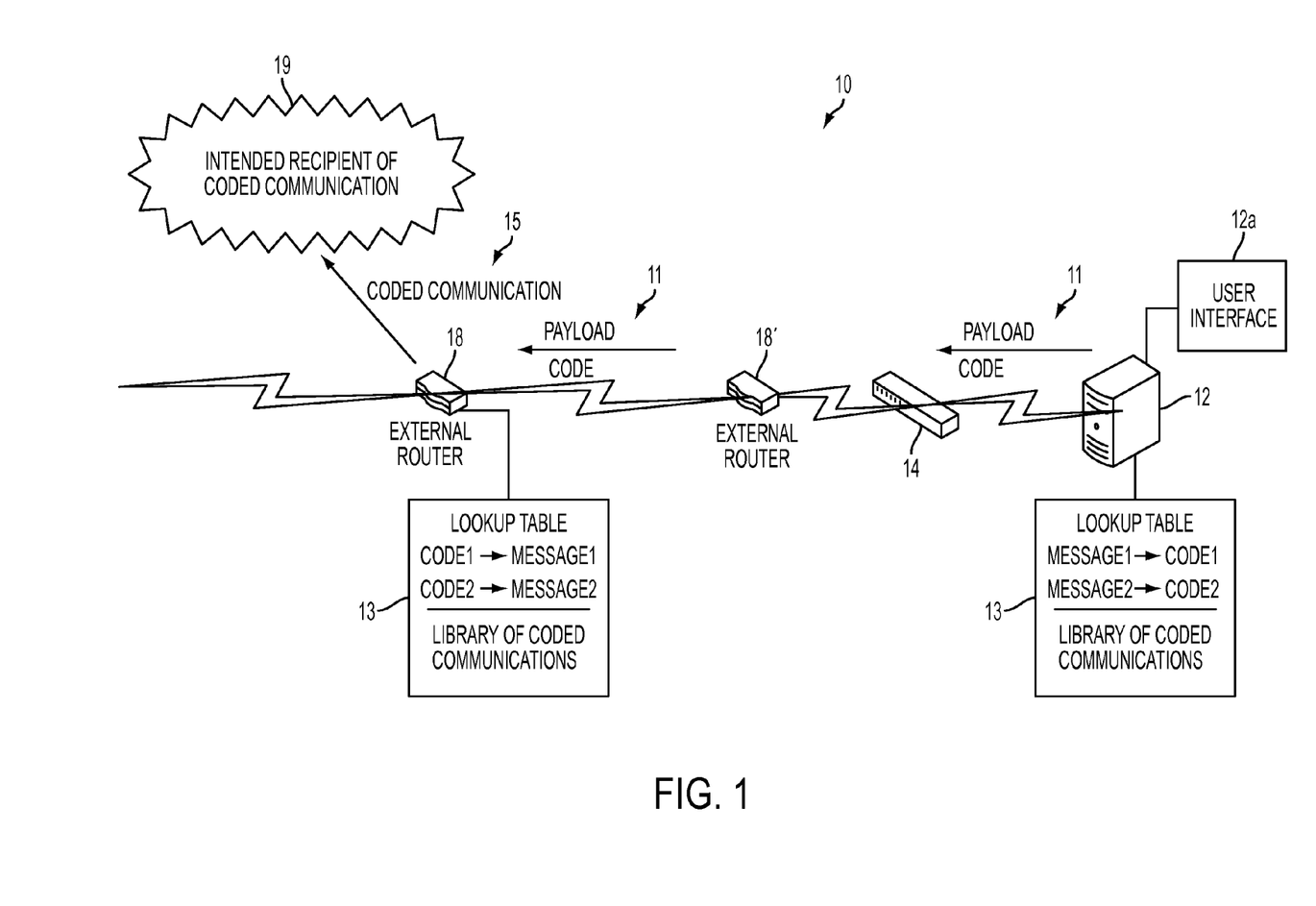
FIG. 1 shows a schematic diagram of a computer system in accordance with a generalized embodiment.

FIG. 1 shows a schematic diagram of an exemplary non-limiting generalized computer system within the context of which may be practiced the generalized embodiment.

Within such an exemplary non-limiting generalized computer system within the context of which may be practiced the generalized embodiment, FIG. 1 shows generally by implication an internet protocol (IP) computer communications system 10 which may be alternatively designated as an internet protocol (IP) computer communications network.

As is illustrated in FIG. 1, a server 12 (i.e., or alternatively a host computer, a terminal or an alternative computer system interface or component (such as but not limited to a router or a firewall) that is intended as a first network component that sends a communication and may be regarded as a "sender" network component) includes a user interface 12a. The exemplary server 12 may comprise any of several computer apparatus or computer apparatus components that may typically comprise an operational computer apparatus. Such operational computer apparatus may include, but are not necessarily limited to, handheld computer and communications apparatus, laptop computer and communications apparatus, desktop computer apparatus, midrange computer apparatus and mainframe computer apparatus. Similarly, the server 12 may operate within the context of any of several operating systems that are otherwise generally conventional in the computer apparatus design, assembly, and programming and operation art.

The user interface 12a is also common within the computer apparatus design, assembly, programming and operation art. Such a computer user interface 12a may include, but is not necessarily limited to graphical user interfaces and non-graphical user interfaces.

As is illustrated within FIG. 1, the server 12 generates and transmits a network data packet 11 which is typically in an IP network data packet format and thus at minimum typically comprises a destination address field (i.e., an IP destination address) and a payload field. The network data packet 11 as illustrated in FIG. 1 also includes a code, which is derived from or selected from a library of coded communications 13 that is accessible to and associated with the server 12. The library of coded communications 13 may generally be in the format of a lookup table that includes individual coded communications (i.e., Message 1 and Message 2) and correlating codes (i.e., CODE 1 and CODE 2), as is illustrated within the library of coded communications 13. The library of coded communications 13 may alternatively be in other formats that provide ready access to a library of pre-determined communications.

Commonly, a network data packet format, such as in particular an IP network data packet format, generally comprises: (1) a destination address field; (2) a source address field; (3) at least one protocol related field (i.e., such as but not limited to a destination port field or a source port field within an IP network data packet format); and (4) a payload field. Thus, the network data packet 11 as is illustrated in FIG. 1 is otherwise generally conventional in the network data packet formatting and transfer art, but for the inclusion of the code.

Within the generalized embodiment in accordance with FIG. 1, the code that is included within the network data packet 11 is included within a field within the network data packet 11 other than the payload field within the network data packet 11. Typically, the code is included within the destination address field, but the generalized embodiment does not preclude placement of the code in another field, such as but not limited to the source address field, or a protocol related field, as long as the code is not placed in the payload field.

With respect to a format of such a code associated with a destination address field of the network data packet 11, a particular non-limiting example of such a code may be .x1.x2.x3.x4, where x1, x2, x3 and x4 are arbitrary intended code numbers or other alphanumeric designators or further other non-alphanumeric designators that as illustrated above are coded to particular communications within the library of coded communications 13 (i.e., such as but not limited to CODE 1 and CODE 2 as illustrated within the library of coded communications 13).

FIG. 1 also shows an internal router 14 (or alternatively a firewall component) located connected to the server 12 (i.e., the first network component) within the computer system 10 and within a network communications pathway of the network data packet 11 that comprises the payload, along with the code. This particular internal router 14 is optional within the computer system whose schematic diagram is illustrated in FIG. 1, but nonetheless when present, this particular router 14 comprises an otherwise generally conventional router component (or firewall component) whose capacity and operational characteristics are otherwise consistent with the design, operational characteristics and requirements of the server 12.

FIG. 1 also shows a first external router 18' and a second external router 18, of which the second external router 18 is in a first instance an illustrative designated second network component (i.e., a designated "interceptor" component, which may alternatively comprise a network component such as but not limited to a server, a terminal or a firewall) within the context of the embodiments. The first external router 18' and the second external router 18 are otherwise generally analogous with the internal router 14, with the following exception with respect to the second external router 18. In particular, the second external router 18 is programmed to: (1) receive, capture or intercept the network data packet 11 from the server 12; (2) read the code included within the network data packet 11 in the field other than the payload field; (3) predicated upon the code that is read select a coded communication 15 from the library of coded communications 13 that is also accessible to and associated with the designated second external router 18; and (4) transmit the selected coded communication 15 from the library of coded communications 13 that corresponds with the code to an intended recipient 19 of the selected coded communication 15.

As is understood by a person skilled in the art, the coded communication 15 may be transmitted to the intended recipient 19 of the coded communication 15 in conjunction with the network data packet 11. Under such circumstances, the coded communications 15 may be simply appended to the network data packet 11. Alternatively, the network data packet 11 may be dropped at the location of the second external router 18, and the coded communication alone, in conjunction with an appropriate destination address which may be derived from the network data packet 11 or under certain circumstances more particularly the library of coded communications 13, may be transmitted to the intended recipient 19 of the coded communication 15. Moreover, the intended recipient 19 of the coded communication 15 within the context of the embodiments may be an intended recipient at a more specifically designated destination address. More generally, the intended recipient 19 may also be generally considered as a neighboring computer sub-system to which the coded communication 15 is transmitted for further processing.

Thus, in accordance with the embodiment as illustrated in FIG. 1, the following particular series of process steps is contemplated for transmission of a particular coded communication 15 to an intended recipient 19: (1) a particular message is codified with a code at the first network component server 12; (2) the code is read at the second network component external router 18 to select a particular coded communication 15 at the second network component external router 18; and (3) the particular coded communication 15 is then transmitted to intended recipient 19. The foregoing scheme for transmitting the particular message (i.e., in the form of a coded communication) to the intended recipient 19 is operative under circumstances where there exists only one intended recipient 19 within the generalized computer system that is illustrated in FIG. 1.

However, the embodiments also contemplate circumstances where multiple intended recipients may exist for the same or different particular messages that are intended to be transmitted as coded communications 15. Under such circumstances, the following scheme for transmitting a particular message as a coded communication to an intended recipient 19 in accordance with the embodiments may be used: (1) first, the particular message and a particular address are codified with a code at the first network component server 12; (2) next, the code is read to provide the particular message (i.e., coded communication 15) and the particular address at the second network component external router 18; and (3) finally, the particular message (i.e., coded communication 15) is transmitted to intended recipient 19 at the particular address.

The embodiments also contemplate more complex coding schemes that may rely upon multiple messages and multiple intended recipients at multiple addresses. Under such circumstances, the following illustrative, but not limiting, scheme may be used: (1) first, the message(s) and the address(es) are codified with a multi-code such as CM1.CM2.CA1.CA2 at the first network component server 12; (2) next, the multi-code is read to provide the message(s) and address(es) at the second network component external router 18, where CM1 and CM2 are a lookup in a library of coded communications and CA1 and CA2 are a lookup in a library of coded addresses; and (3) the particular coded communications 15 are transmitted to the particular intended recipients 19 at the particular addresses.

As a further alternative, the embodiments also contemplate a situation where a first network component comprises more than one first network component for purposes for codifying with a code a particular message and a particular address. Under such circumstances, for example and without limitation, the first network component server 12 may be used to provide a first codification of messages within the context of a library of coded communications 13 and a second server (or alternative network component which in conjunction with the first network component server 12 may be regarded as a "first network component", in particular with respect to the claims that follow) may be used to further codify the library of coded communications with respect to addresses for individual intended recipients.

As yet another further alternative, the embodiments also contemplate that the reading of the code within the network data packet 11 and the transmitting of the selected coded communication 15 from the library of coded communications 13 to the intended recipient 19 may similarly be undertaken using a plurality of network components that in an aggregate comprise a "second network component". For example, the embodiments anticipate that, for example and without limitation: (1) the first external router 18' may simply read the network data packet 11 to ascertain or determine the existence of a code, and then transmit a network data packet that includes the code specifically to the second external router 18 where; (2) the code is read, a coded communication 15 is selected from the library of coded communications 13 and the selected coded communication 15 is transmitted to the intended recipient 19.

The foregoing are intended as illustrative of coded communication schemes and message transmission sequences in accordance with the embodiments (which are applicable with respect to the foregoing generalized computer system as well as the following more specific computer system), rather than limiting of coded communication schemes and message transmission sequences in accordance with the embodiments.

Thus, the foregoing generalized computer system provides a capability of multi-level communication by utilizing: (1) the payload field within the network data packet 11; and (2) a code within a field other than the payload field within the network data packet 11, in conjunction with the library of coded communications 13.

Figure 2:
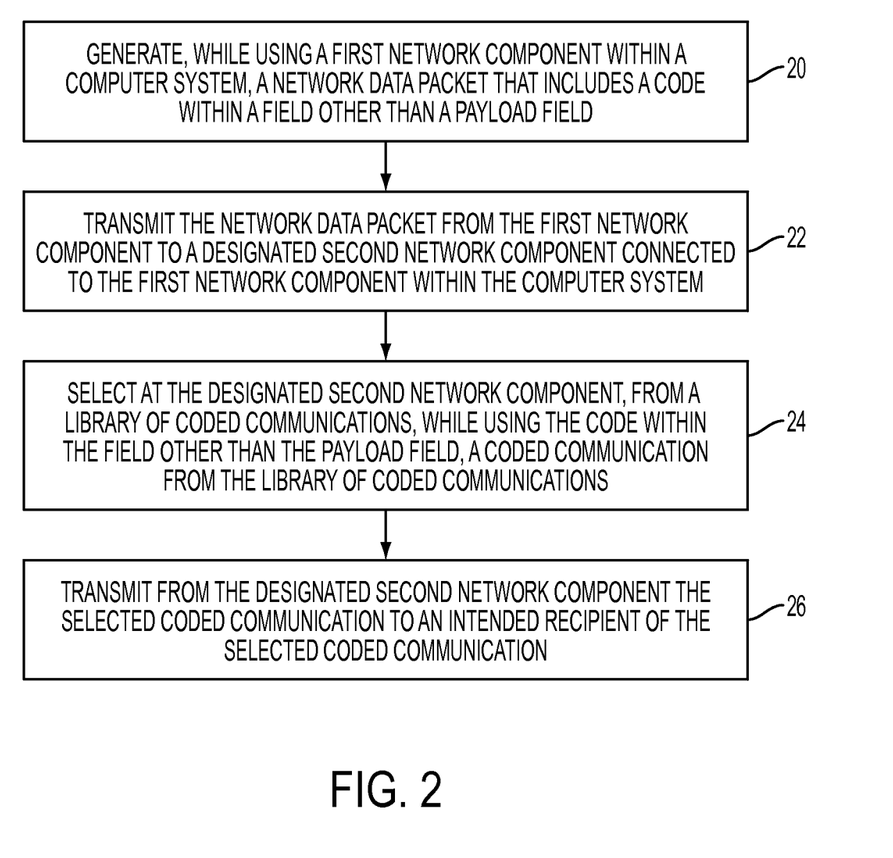
FIG. 2 shows a block text diagram describing several process steps in operation of the computer system in accordance with the generalized embodiment, as illustrated within the schematic diagram of FIG. 1.

FIG. 2 shows a block text diagram describing in greater detail a series of process steps for operation of the generalized computer system whose schematic diagram is illustrated in FIG. 1, thus providing a method in accordance with the generalized embodiment.

FIG. 2 at reference numeral 20 provides for generating, while using a first network component within a computer system, a network data packet that includes a code within a field other than a payload field.

The foregoing process step is intended to correlate with the generation by the server 12 of the network data packet 11 that includes the code within the field other than the payload field, as illustrated in FIG. 1.

FIG. 2 at reference numeral 22 provides for transmitting the network data packet from the first network component to a designated second network component connected to the first network component within the computer system.

The foregoing process step is intended to correlate with transmitting of the network data packet 11 from the server 12 to the designated second external router 18 as is illustrated in FIG. 1.

FIG. 2 at reference numeral 24 provides for selecting at the second network component, from a library of coded communications while using the code within the field other than the payload field, a coded communication within the library of coded communications.

The foregoing process step is intended to correlate with the selection by the designated second external router 18 of a particular coded communication 15 from the library of coded communications 13 that is accessible to and associated with the designated second external router 18.

FIG. 2 at reference numeral 26 provides for transmitting from the designated second network component the selected coded communication to an intended recipient of the coded communication.

The foregoing process step is intended to correlate with the transmitting from the designated second external router 18 of the selected coded communication 15 from the library of coded communications 13 to the intended recipient 19 of the coded communication 15 for further processing and transmission of the coded communication 15.

Thus in accordance with the foregoing schematic diagram of FIG. 1 and block text diagram of FIG. 2, the generalized embodiment provides a computer system and a method for multi-level communication from the computer system by utilizing in addition to a payload field within a network data packet a code within a field within the network data packet other than the payload field within the network data packet, in conjunction with a library of coded communications.

The generalized embodiment in accordance the schematic diagram of FIG. 1 and the block text diagram of FIG. 2 provides value within the context of a communications system insofar as communications that are transmitted within other than the payload field of a network data packet are unexpected and thus generally hidden.

Restricted Access Computer System

Figure 3:
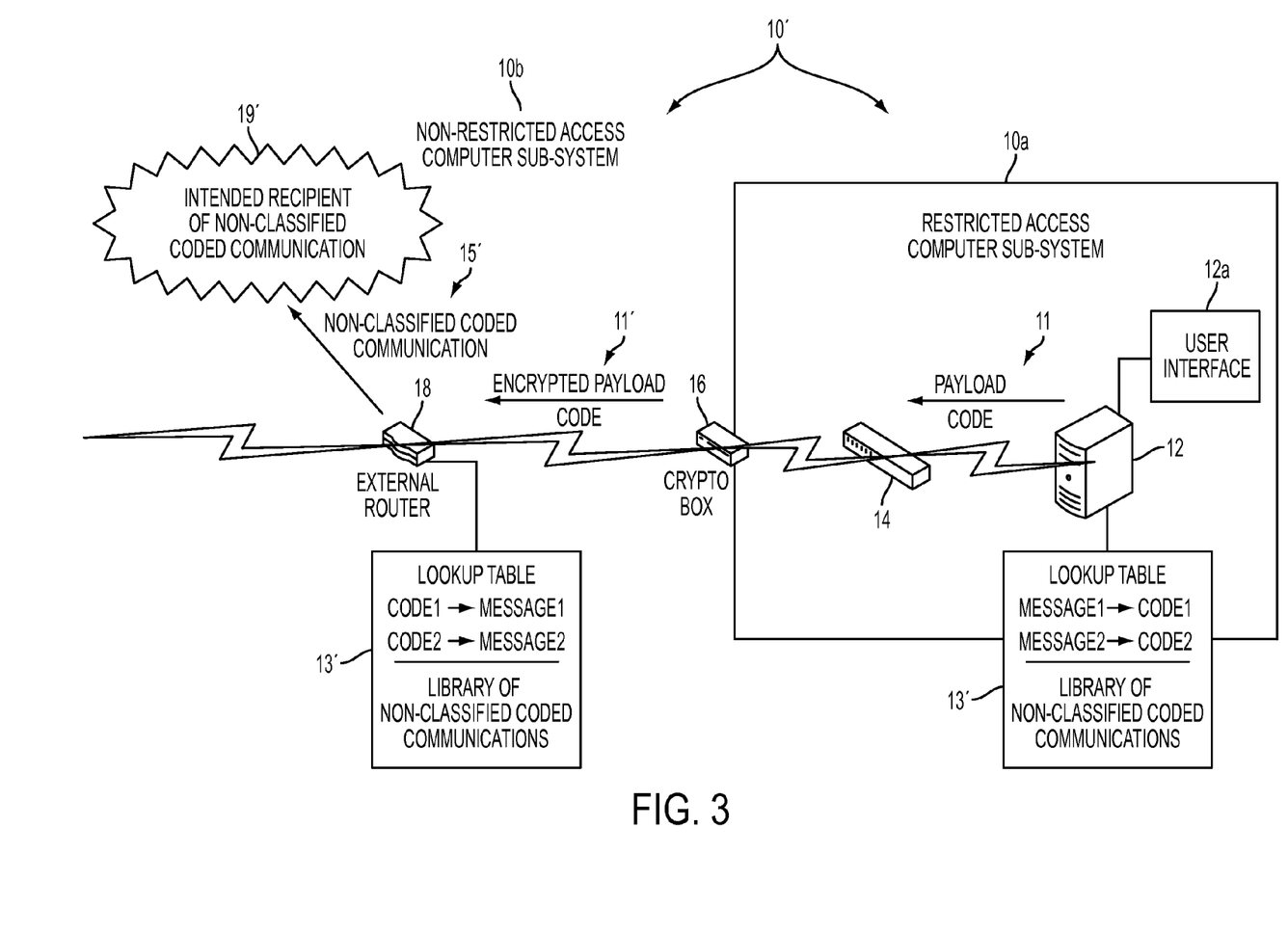
FIG. 3 shows a schematic diagram of a restricted access computer system in accordance with a more specific embodiment.

FIG. 3 shows a schematic diagram of an exemplary non-limiting restricted access computer system within the context of which may also be practiced a more specific embodiment.

Within such an exemplary non-limiting restricted access computer system within the context of which may also be practiced the more specific embodiment, FIG. 3 also shows by implication an internet protocol (IP) restricted access computer system 10' generally within the context of an internet protocol (IP) communication network, that further includes: (1) a restricted access computer sub-system 10*a* located embedded within and contiguous with; (2) a non-restricted access computer sub-system 10*b*. As is understood by a person skilled in the art, the restricted access computer sub-system 10*a* need not necessarily be physically separated from the non-restricted access computer sub-system 10*b*, but nonetheless such a physical separation of the restricted access computer sub-system 10*a* and the non-restricted access computer sub-system 10*b* is often, if not necessarily generally, common within the context of restricted access computer systems.

As is understood by a person skilled in the art, the restricted access computer sub-system 10*a* and the non-restricted access computer sub-system 10*b* may alternatively be separated solely by appropriate network communications software components or network communications hardware components that effectively provide the restricted access computer sub-system 10*a* embedded within and contiguous with the non-restricted access computer sub-system 10*b*. Such network communications software components or network communications hardware components may include, but are not necessarily limited to, firewall components that are executed within the context of both software components and hardware components.

As is illustrated within the schematic diagram of FIG. 3 the network components that are included within the restricted access computer system 10' are largely identical with the network components that are included within the generalized computer system 10 that is illustrated in FIG. 1 with the notable exception of substitution of an encryption component 16 (i.e., designated as a cryptobox) for the first external router 18'. As is also illustrated in FIG. 3, the server 12 (i.e., an illustrative first network component) is located completely within the restricted access computer sub-system 10*a*, the encryption component 16 is located at least in-part within the restricted access computer sub-system 10*a*, and the (now sole) external router 18 (i.e., an illustrative designated second network component) is located at least in-part (and generally completely) within the non-restricted access computer sub-system 10*b*.

The cryptographic component 16 is intended to operate in an otherwise generally conventional fashion within the context of the several network components within the restricted access computer sub-system 10*a* and the non-restricted access computer sub-system 10*b* that are illustrated in FIG. 3. Moreover, the cryptographic component 16 that is illustrated in FIG. 3 is intended to encrypt the unencrypted network data packet 11 generated by and transmitted from the server 12 (i.e., the illustrative first network component) within the restricted access computer sub-system 10*a* and provide therefrom an encrypted network data packet 11' within the non-restricted access computer sub-system 10*b*. As is illustrated within the schematic diagram of FIG. 1, the encrypted network data packet 11' includes the code (as unencrypted), and an encrypted payload that is derived from the unencrypted payload from the unencrypted network data packet 11.

Thus, this more specific embodiment is operative under conditions where in addition to utilizing for multi-level communications the payload field within a network data packet and a field other than a payload field within a network data packet (such as within the foregoing generalized embodiment), the selected field other than the payload field within the network data packet is also an unencryptable field. Otherwise, the selection of particular fields for incorporation of a code within a network data packet for multi-level communication within this more specific embodiment parallel selection of fields for incorporation of a code for multi-level communication in accordance with the foregoing generalized embodiment.

As is illustrated within the schematic diagram of FIG. 3, this more specific embodiment also substitutes: (1) for the library of coded communications 13 that is illustrated in FIG. 1 a library of non-classified coded communications 13'; and (2) for a particular selected coded communication 15 from the library of coded communications 13 that is transmitted to the intended recipient 19 of the particular selected coded communication 15 a particular selected non-classified coded communication 15' from the library of non-classified coded communications 13' that is transmitted to an intended recipient 19' of the particular selected non-classified coded communication 15'.

Figure 4:
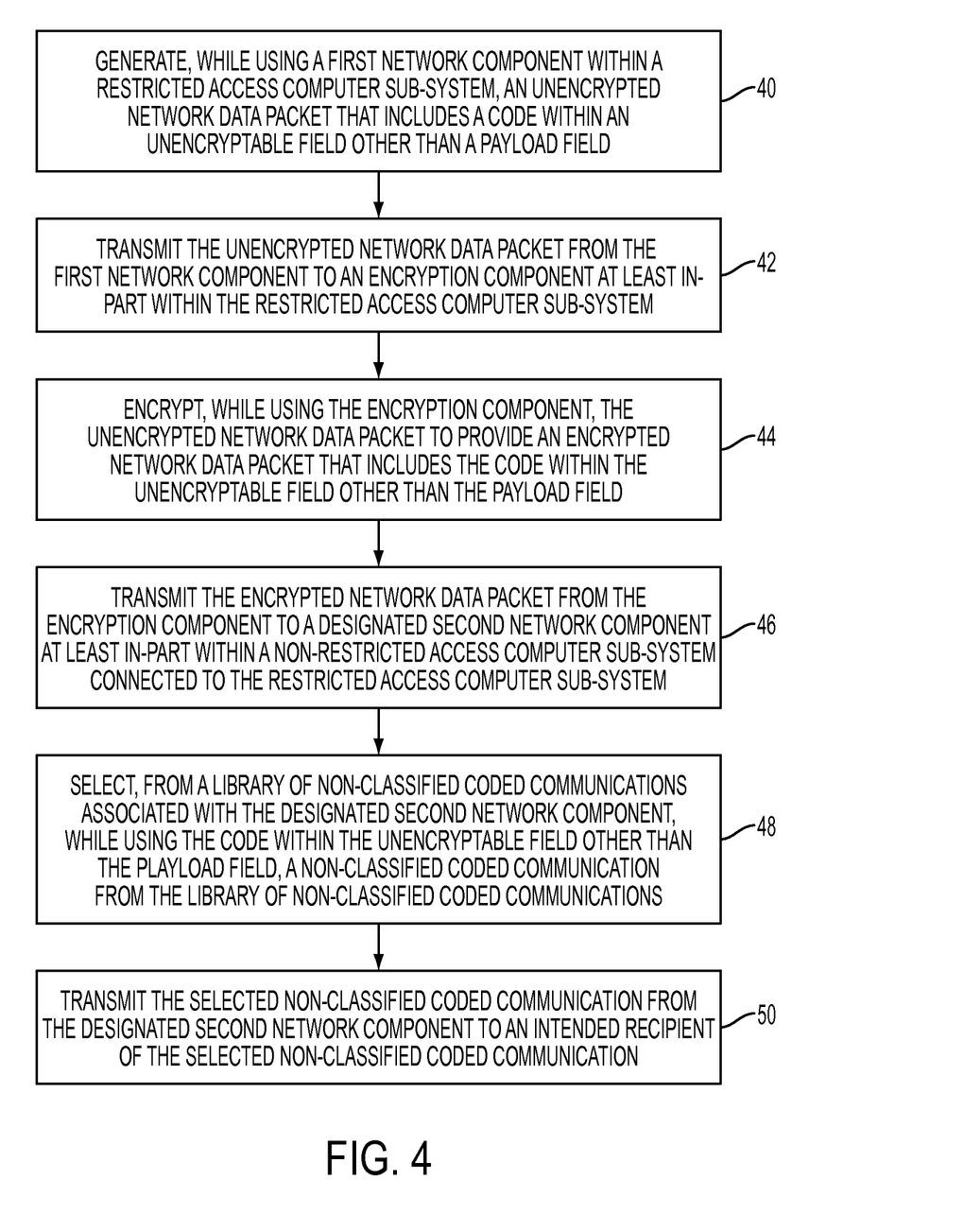
FIG. 4 shows a block text diagram describing several process steps in operation of the restricted access computer system in accordance with the more specific embodiment, as illustrated within the schematic diagram of FIG. 3.

FIG. 4 shows a block text diagram that amplifies upon, and further elaborates upon, a series of process steps that is undertaken within the context of the restricted access computer system whose schematic diagram is illustrated in FIG. 3. This particular series of process steps provides a method in accordance with the foregoing more specific embodiment.

To that end, FIG. 4 at reference numeral 40 provides for generating, while using a first network component within a restricted access computer sub-system, an unencrypted network data packet that includes a code within an unencryptable field other than a payload field.

Within the context of the restricted access computer system whose schematic diagram is illustrated in FIG. 3, such an unencrypted network data packet is intended as the unencrypted network data packet 11, which as illustrated in FIG. 3 otherwise comprises at minimum a code and a payload. As discussed above, commonly, but not exclusively, a network data packet will include a destination address field, a source address field, at least one protocol field and a payload field. Of the foregoing components of a network data packet, routinely the destination address field and the source address field may be unencryptable fields under circumstances of two-way communication, or the destination address field may be unencryptable under circumstances of only one-way communication, and for that reason the embodiments provide that most commonly the destination address field of a network data packet (or alternatively a source address field of a network data packet) will include a code in accordance with the more specific embodiment, and as further discussed above within the context of the generalized embodiment.

FIG. 4 at reference numeral 42 provides for transmitting the unencrypted network data packet from the first network component to an encryption component at least in-part within the restricted access computer sub-system.

Within the context of the restricted access computer system 10' of FIG. 3, the foregoing transmitting of the unencrypted network data packet corresponds with the transmitting of the unencrypted network data packet 11 from the server 12 to the encryption component 16 at the juncture of the restricted access computer sub-system 10a and the non-restricted access computer sub-system 10b.

FIG. 4 at reference numeral 44 provides for encrypting, while using the encryption component, the unencrypted network data packet that contains the code within the unencryptable field other than the payload field to provide an encrypted network data packet that contains the code within the unencryptable field other than the payload field.

Within the context of the restricted access computer system that is illustrated within FIG. 3, such an encryption of the unencrypted network data packet to provide the encrypted network data packet is intended to correlate with encryption of the unencrypted network data packet 11 to provide the encrypted network data packet 11', as is illustrated in FIG. 3, while using the encryption component 16.

FIG. 4 at reference numeral 46 provides for transmitting the encrypted network data packet from the encryption component to a designated second network component at least in-part within a non-restricted access computer sub-system connected to the restricted access computer sub-system.

Within the context of the restricted access computer system that is illustrated within FIG. 3, such a transmission or interception of the encrypted network data packet from the encryption component to the second network component at least in-part within the non-restricted access computer sub-system connected to the restricted access computer sub-system is intended as the receipt or interception of the encrypted network data packet 11' by the designated external router 18 that is illustrated within the schematic diagram of FIG. 3.

FIG. 4 at reference number 48 provides for selecting from a library of non-classified coded communications associated with the designated second network component, while using the code within the unencryptable field other than the payload field within the encrypted network data packet, a non-classified coded communication within the library of non-classified coded communications.

Within the context of the restricted access computer system that is illustrated in FIG. 3, the foregoing selection of the non-classified coded communication from the library of non-classified coded communications by the designated second network component is intended as the selection of the non-classified coded communication 15' from the library of non-classified coded communications 13' by the designated external router 18 that is illustrated in FIG. 3.

Finally, FIG. 4 at reference numeral 50 provides for transmitting the selected non-classified coded communication from the designated second network component to an intended recipient of the selected non-classified coded communication.

Within the context of the restricted access computer system that is illustrated in FIG. 3, the foregoing transmitting of the non-classified coded communication from the second network component to the intended recipient of the selected non-classified coded communication is intended as the transmitting of the non-classified coded communication 15' from the designated external router 18 to the intended recipient 19' of the non-classified coded communication 15', as is illustrated in FIG. 3.

Examples of particular non-classified coded communications that may be transmitted within the context of a restricted access computer system and related method for operating the restricted access computer system in accordance with the more specific embodiment may include, but are not necessarily limited to: (1) status communications related to staffing and availability of the restricted access computer sub-system 10a; and (2) and operational communications that may relate to specific characteristics and nuances of workload requests that may be placed or completed within the restricted access computer sub-system 10a in accordance with the embodiment. Particular status communications in accordance with the foregoing may include, but are not necessarily limited to: (1) notice of success or failure of back-up procedures; (2) notice of processing sequence or location of particular work-in-progress (WIP); and (3) notice of execution of reboot procedures due hardware component failure.

As is understood within the context of the foregoing description, the more specific embodiment thus provides a restricted access computer system and a method for operating the restricted access computer system that provide for secure non-classified communication from the restricted access computer system by appending to a network data packet a selected non-classified coded communication or substituting for the network data packet the selected non-classified coded communication, where the network data packet may or may not include a classified communication within the context of a network data packet encrypted payload.

In order to facilitate operation of a generalized computer system or a restricted access computer system in accordance with the embodiments, the foregoing generalized computer system, restricted access computer system and related methods for operation thereof in accordance with the embodiments also contemplate that a computer program product is also within the context of the embodiments. Such a computer program product comprises a tangible medium that provides instructions encoded therein for: (1) introducing, while using a first network component, a code within a field other than a payload field within a network data packet; and (2) selecting, while using a second network component connected to the first network component and the code within the field other than the payload field, a coded communication from a library of coded communications associated with the second network component.

Accordingly, within the context of the above, computer program product aspects of the embodiments may take the form of a computer program product embodied in one or more computer readable media having computer readable program code embodied thereon.

Any combination of one or more computer readable media may be utilized. The computer readable media may be a computer readable signal media or a computer readable storage media. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage media would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store, a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process, such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment or portion of code, which comprises one or more executable instructions for implementing the specified logical function or functions. It should also be noted that in some alternative implementations the functions noted in the block may occur out of the order noted in the figures. For example, two blocks shown in succession may in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instruction. Accordingly, the embodiments of the invention are illustrative of the invention rather than limiting of the invention. Revisions and modifications may be made to components, connections and computer system architecture in accordance with the embodiments while still providing a system, a method and a computer program product in accordance with the embodiments, further in accordance with the accompanying claims.

What is claimed is:

1. A computer system comprising:
   a first network component located in a restricted access computer sub-system and programmed to include within an unencryptable field other than a payload field within a network data packet a code that corresponds with a coded communication within a library of coded communications;
   an encryption component located at least in part within the restricted access computer sub-system, connected to the first network component, and programmed to encrypt the network data packet to provide an encrypted network data packet having the code within the unencryptable field other than the payload field; and
   a second network component located at least in part within a non-restricted access computer sub-system connected to the first network component and the encryption component, and programmed to read the code within the unencryptable field other than the payload field within the network data packet and select the coded communication from the library of coded communications that corresponds with the code.

2. The computer system of claim 1 wherein the second network component is further programmed to transmit the selected coded communication from the library of coded communications that corresponds with the code to an intended recipient of the selected coded communication.

3. The computer system of claim 1 wherein the unencryptable field other than the payload field is a destination address field.

4. The computer system of claim 1 wherein the unencryptable field other than the payload field is selected from the group consisting of a source address field and a protocol field.

5. The computer system of claim 1 wherein each of the first network component and the second network component is selected from the group consisting of a server, a terminal, a router and a firewall.

6. A computer system comprising:
a first network component located in a restricted access computer sub-system and programmed to include within an unencryptable field other than a payload field within an unencrypted network data packet a code that corresponds with a non-classified coded communication within a library of non-classified coded communications;
an encryption component located at least in part within the restricted access computer sub-system, connected to the first network component and programmed to encrypt the unencrypted network data packet to provide an encrypted network data packet having the code within the unencryptable field other than the payload field; and
a second network component located at least in part within a non-restricted access computer sub-system connected to the restricted access computer sub-system and the encryption component, and programmed to read the code within the unencryptable field other than the payload field within the encrypted network data packet and select the non-classified coded communication from the library of non-classified coded communications that corresponds with the code.

7. The computer system of claim 6 wherein the second network component is further programmed to transmit the selected non-classified coded communication from the library of coded communications that corresponds with the code to an intended recipient of the selected non-classified coded communication.

8. The computer system of claim 6 wherein the unencryptable field other than the payload field is a destination address field.

9. The computer system of claim 6 wherein the unencryptable field other than the payload field is selected from the group consisting of a source address field and a protocol field.

10. The computer system of claim 6 wherein each of the first network component and the second network component is selected from the group consisting of a server, a terminal, a router and a firewall.

11. A method for multi-level communication within a computer system comprising:
generating within a first network component, located in a restricted access computer sub-system, a network data packet that contains within an unencryptable field other than a payload field a code corresponding with a coded communication within a library of coded communications;
transmitting the network data packet from the first network component to an encryption component located at least in part within the restricted access computer sub-system and connected to the first network component;
encrypting, by the encryption component, the network data packet to provide an encrypted network data packet having the code within the unencryptable field other than the payload field;
transmitting the network data packet to a designated second network component located at least in part within a non-restricted access computer sub-system and connected to the first network component;
reading within the second network component the code within the unencryptable field other than the payload field and selecting within the second network component the coded communication from the library of coded communications that corresponds with the code; and
transmitting the selected coded communication from the library of coded communications that corresponds with the code from the second network component to an intended recipient of the selected coded communication.

12. The method of claim 11 wherein the unencryptable field other than the payload field is a destination address field.

13. The method of claim 11 wherein the unencryptable field other than the payload field is selected from the group consisting of a source address field and a protocol field.

14. The method of claim 11 wherein the transmitting the selected coded communication is undertaken simultaneously with a payload communication.

15. The method of claim 11 wherein the transmitting the selected coded communication is undertaken absent a payload communication.

16. A method for non-classified communication from a restricted access computer system comprising:
generating within a first network component within a restricted access computer sub-system an unencrypted network data packet that contains a code within an unencryptable field other than a payload field that corresponds with a coded communication within a library of coded communications;
transmitting the unencrypted network data packet from the first network component to an encryption component at least in-part within the restricted access computer sub-system;
encrypting within the encryption component the unencrypted network data packet to provide an encrypted network data packet that contains the code within the unencryptable field other than the payload field;
transmitting the encrypted network data packet from the encryption component to a designated second network component at least in-part within a non-restricted access computer sub-system connected to the restricted access computer sub-system;
reading within the designated second network component the code and selecting within the second network component the non-classified coded communication from the library of non-classified coded communications that corresponds with the code; and
transmitting the selected non-classified coded communication from the designated second network component to an intended recipient of the selected non-classified coded communication.

17. The method of claim 16 wherein the unencryptable field other than the payload field comprises a destination address field.

18. The method of claim 16 wherein the unencryptable field other than the payload field is selected from the group consisting of a source address field and a protocol field.

19. The method of claim 16 wherein the transmitting the selected non-classified coded communication is undertaken simultaneously with a payload communication.

20. The method of claim 16 wherein the transmitting the selected non-classified coded communication is undertaken absent a payload communication.

21. A computer program product for multi-level communication comprising:
a non-transitory medium encoded with computer readable instructions to:
generate, while using a first network component located in a restricted access computer sub-system, a network data packet including within an unencryptable field other than a payload field a code for a coded communication from a library of coded communications;
encrypt, while using an encryption component located at least in part within the restricted access computer sub-system and connected to the first network component, the network data packet to provide an encrypted network data packet having the code within the unencryptable field other than the payload field; and
select, while using the code within the unencryptable field other than the payload field within the network data packet, and a designated second network component located at least in part within a non-restricted access computer sub-system and connected to the first network component and the encryption component, the coded communication from a library of coded communications that corresponds with the code.

22. The computer program product of claim 21 wherein the non-transitory medium is further encoded with computer readable instructions to transmit the selected coded communication from the library of coded communications that corresponds with the code from the designated second network component to an intended recipient of the selected coded communication.

23. The computer program product of claim 21 wherein the unencryptable field other than the payload field comprises a destination address field.

24. The computer program product of claim 21 wherein the unencryptable field other than the payload field is selected from the group consisting of a source address field and a protocol field.

* * * * *